United States Patent [19]
Myers

[11] Patent Number: 5,633,022
[45] Date of Patent: May 27, 1997

[54] DIFFERENTIAL TEMPERATURE VACUUM-FORMING TOOL

[75] Inventor: Donald G. Myers, Baltimore, Md.

[73] Assignee: Old Line Plastics, Inc., Forest Hill, Md.

[21] Appl. No.: 488,478

[22] Filed: Jun. 8, 1995

[51] Int. Cl.⁶ .................. B29C 51/10; B29C 51/42
[52] U.S. Cl. ............... 425/384; 264/509; 264/522; 264/554; 425/388
[58] Field of Search .................. 425/384, 387.1, 425/388, 403; 264/132, 327, 509, 522, 554, 521, 519

[56] References Cited

U.S. PATENT DOCUMENTS

| | | | |
|---|---|---|---|
| 3,632,252 | 1/1972 | Amberg et al. | 425/168 |
| 3,866,660 | 2/1975 | Gill | 164/108 |
| 3,896,207 | 7/1975 | Cospen et al. | 264/322 |
| 3,929,952 | 12/1975 | Edwards | 264/521 |
| 4,302,415 | 11/1981 | Lake | 425/388 |
| 4,379,687 | 4/1983 | Wilson et al. | 425/388 |
| 4,639,341 | 1/1987 | Hanamoto et al. | 264/40.1 |
| 4,862,676 | 9/1989 | Mancini | 264/522 |
| 4,927,591 | 5/1990 | Nilsson | 264/521 |
| 5,098,633 | 3/1992 | Hausler | 264/511 |
| 5,264,172 | 11/1993 | Rosica et al. | 264/132 |
| 5,374,179 | 12/1994 | Swanson | 425/384 |

*Primary Examiner*—Jay H. Woo
*Assistant Examiner*—Joseph Leyson
*Attorney, Agent, or Firm*—Leonard Bloom

[57] ABSTRACT

The disclosure is directed to a differential temperature vacuum forming tool having differentially heated sections. In a specific application, vacuum formed plastic buttons with indicia thereon are produced without distortion of the print indicia. The vacuum forming tool accepts a printed plastic overlay for shaping; and the shaped printed plastic overlay can be used to produce back-lit buttons.

6 Claims, 9 Drawing Sheets

DIFFERENTIAL TEMPERATURE VACUUM-FORMING TOOL

FIELD OF THE INVENTION

This invention relates to the molding of plastic articles and, more specifically, the molding of plastic push buttons.

BACKGROUND OF THE INVENTION

Molded plastic articles and appliance parts are items well known to the consumer. In the manufacture of automobiles, many parts are made of molded plastic. These parts range from larger parts such as automobile body and fenders, to smaller parts such as latches and push buttons. In many instances, the plastic is molded with printed indicia thereon and if care is not taken during the molding process, the print will become distorted.

Prior Art U.S.A. Patents

Hausler in U.S. Pat. No. 5,098,637 discloses a thermoformed back-lit button with a graphic display. The button has a thermoformed plastic cap overlaid upon an injection molded wall. The cap is formed utilizing a screen printed plastic sheet having a lithographed symbol produced by screen printing. The sheet is placed between a female segment and a heated manifold. The temperature is elevated to heat the sheet. A depression avoids intimate heat contact with the sheet over the graphics and thus heat insulates the graphic symbol so as to prevent variation and distortion of the ink graphic on the sheet during the molding process. The noted depression provides a temperature differential across the surface of the sheet. A vacuum within female mold cavities and a pressure upon the opposite side of the thermoformable sheet are employed to mold the sheet.

Rosica et al in U.S. Pat. No. 5,264,172 (assigned to Kaumograph Flint Corp.) discloses a method of making a molded applique product. In making their product, a printed applique substrate is formed into a three-dimensional shape and then placed into a mold and molten resin injected into the mold cavity space behind the formed applique substrate. Specifically, a flat substrate with printing on its front surface is pre-cut and formed into a three-dimensional shape (preferably by a cold forming process which reduces internal stress). Then a mold having the same configuration as the formed substrate is injected with a hot resin behind the substrate to give it body. This is done while the area in which the applique sits is cooled. This process produces a one-piece permanently bonded applique product having a three-dimensional shaped configuration. It is significant to note that the Rosica et al process cold forms the three dimensional shape from the flat substrate.

In U.S. Pat. No. 4,639,341, Hanamoto et al disclose a method of injection molding articles while simultaneously forming patterns thereon. They disclose a molding process wherein a strip-like pattern sheet has a plurality of patterns and register marks spaced apart from each other. The sheet covers the opening of a female mold and is heated and pressed by compressed air and vacuum against the cavity surface of the female mold. After this step, a male mold section is mated to a female mold section to form a cavity for injecting resin to shape the finally formed article.

Amberg et al in U.S. Pat. No. 3,632,252 disclose a process of thermoforming articles of plastic material to obtain a minimal amount of distortion of printed information. The plastic is brought to its softening point temperature and then brought back to its normal room temperature without visibly distorting the printed information contained thereon. The heating means of Amberg et al is above the sheet to be molded. Amberg et al recognize the need to maintain a temperature differential during the molding process and maintain the printed material of the molded plastic at a temperature less than the stretched and molded plastic. In the Amberg et al process, the printed area of the plastic is kept at a temperature higher than the surrounding area.

A multi-temperature film die for the fabrication of plastic containers such as bags, envelopes, etc. is disclosed by Swanson in U.S. Pat. No. 5,374,179. The die is an integrated sectionalized structure having independent, adjacent temperature regulated die sections which are maintained at different temperatures for performing simultaneously, two or more operations.

None of the prior art patents cited teaches or describes a differentially heated vacuum forming tool wherein the tool has different and distinct temperature zones opposite a single surface of the sheet to be shaped.

There are several commercially practiced methods for molding buttons containing lettering or other printed indicia.

1. A commonly used commercial molding process first molds the letters or print and then injection molds around these letters or print. With this method there is difficulty in obtaining an efficiently illuminated back-lit button.

2. Another method used commercially, first molds a white (or colored) plastic button. The button is then painted over, e.g., with black paint. Finally, the top layer of paint is laser etched leaving the white plastic to form the print or indicia. This method is not cost efficient, uses expensive equipment and does not have good print-wear.

3. A third prior art commercial molding process employs a single molding operation employing a single temperature mold. This single temperature molding is inefficient in that the intensity of light coming from behind the molded button is not balanced and this imbalance is difficult to compensate for.

The differential temperature vacuum forming method of this invention prevents print or indicia distortion common in the prior art plastic molding processes. Further, the inventive method is efficient and cost-effective. Expensive machinery is not needed and few, if any defective parts are found in the finished product.

The invention herein disclosed solves a problem of long standing, namely print distortion when vacuum forming the overlay. As a result of the process of this invention, there is provided a quality product with substantial reduction of manufacturing cost. The present invention because of lower costs and high quality expands the use of vacuum formed overlays for use in the automotive industry; and particularly the manufacture of the back-lit buttons.

OBJECTS OF THE INVENTION

A primary object of this invention is to heat a plastic sheet with print thereon and not have the print thereon distorted during the vacuum forming and shaping process.

A further object is to efficiently produce plastic vacuum formed buttons or button inserts having printed indicia thereon wherein the print is not distorted during molding and shaping.

A major object of this invention is the manufacture of print-bearing back-lit buttons without print distortion.

SUMMARY OF THE INVENTION

The invention herein describes a vacuum forming tool, plastic molded articles produced therewith and processes for producing the plastic molded articles.

An overall general process for producing a vacuum formed button of this invention involves:

1) Obtaining a flat plastic overlay with printed indicia thereon. A typical printed overlay can be purchased commercially from various manufacturers. The specifications of a typical overlay are set forth below after the process steps.
2) Vacuum-forming the overlay, to form dome-shaped button inserts.
3) Die-cut the vacuum formed overlay to substantially separate the button inserts from the overlay leaving only small connecting tabs in place joining the button inserts. This is done to properly fit the button inserts into the injection mold.
4) Place the die-cut button inserts into an injection mold and injection molding the button inserts to give them body to create the buttons per se.
5) Excess material is trimmed from the injection molded button to make the finished product.

The process set forth above can be carried out with the printed indicia printed on the top surface of the overlay, known in the art as first surface printing; or on the bottom surface of the overlay, known in the art as second surface printing.

A typical overlay purchased from many suppliers on the open market and used in this invention is a flat overlay 2⅞" by 6⅝" and 0.020" thick. It is a polycarbonate sheet, glossy on one side having silk screen art work thereon. The overlay may have a series of coats:

A. Black fuzzy opaque coat.
B. Blue coat.
C. White coat.
D. Black top coat with art work and trim cross hairs.
E. Light balancing pass on reverse side cross-linked polyester inks for formability parts die cut into individual parts (screen in a sheet of 64$^+$).

A detailed process for specially producing vacuum formed button inserts from the flat overlay using the vacuum forming tool (step 2 above) in general involves the following steps:

1) Check and assure all temperatures of the vacuum forming tool at the outset of the process cycle. That is, all temperatures, both heating as well as cooling, should be checked to determine that they are accurate and stable.
2) The plastic flat overlay is placed in a four-sided aluminum frame, with the clearance being approximately 0.010 inches in the length and width.
3) An operator engages a two hand control to start the process.
4) Once the process is started, a hinged water-cooled clamping door closes by pneumatic cylinder over the overlay.
5) A heater box slides forward pneumatically over the clamping door and overlay, and remains forward for approximately 30 seconds to heat the overlay to its forming temperature.
6) The heater box is retracted pneumatically.
7) The vacuum forming tool is raised into position by pneumatic cylinder.
8) With the tool in full up position, that is close to the heated overlay, a vacuum is applied. (The preferred vacuum being 29" Hg.).
9) The vacuum after being applied for several seconds is switched off.
10) With the vacuum off, the vacuum forming tool is lowered from the overlay by the pneumatic cylinder.
11) The hinged water cooled clamp door opens pneumatically.
12) The vacuum formed part is removed from the frame.

The central feature of the herein disclosed invention is a differential temperature vacuum forming tool for vacuum forming a moldable sheet. The tool has a projecting male portion and surrounding said projecting male portion a separated recessed portion. The projecting male portion is cooled to a temperature less than the separated recessed portion. When a moldable sheet with indicia thereon is applied over said differentially heated tools i.e. cooled projecting male portion and heated separated recessed portion and with a vacuum applied to the moldable sheet, a deep button insert without distortion of indicia is formed around the projecting male portion of the vacuum forming tool.

The differential temperature vacuum forming tool is provided with an attached vacuum assembly, able to draw down a moldable sheet over the projecting male portion of the tool.

The tool can have a frame for holding a moldable sheet juxtaposed above the projecting male section of the differential temperature vacuum forming tool. There is also a heater for heating and softening the moldable sheet held in the frame.

In addition there is a mechanism attached to the differential temperature vacuum forming tool to raise it to a position below the moldable sheet.

Between the projecting male portion and separated recessed portion there can be insulation separating the portions.

The invention herein entails a process for producing a vacuum formed button insert. A heated, heat-moldable printed overlay is provided over a differential temperature vacuum forming tool. The tool comprises a projecting male portion, and surrounding said projecting male portion a separated recessed portion. The projecting male portion is cooled to a temperature less than the separated recessed portion. Then a vacuum is created on the heated, heat moldable overlay to bring the overlay into forming contact with said projecting male portion.

Specifically in the process, the projecting male portion of the vacuum forming tool is cooled to a temperature of about 40° F. and the separated recessed portion surrounding the projecting male portion being heated to 140° F. The heat provided to the heated, heat-moldable overlay is at a temperature of about 550° F. with the heat-moldable overlay being plastic, e.g., polycarbonate plastic.

In specific application the invention is a combination of a differentially heated vacuum forming tool for vacuum forming a moldable sheet comprising a projecting male portion and surrounding said projecting male portion a separated recessed portion. The projecting male portion is cooled to a temperature less than the separated recessed portion. A frame is set above said projecting male portion for holding said moldable sheet. The vacuum forming tool is also provided with a heating element to heat the moldable sheet and a vacuum means to create a vacuum on the moldable sheet to draw the heated moldable sheet over the projecting male portion. As previously pointed out indicia on a plastic moldable sheet will not distort during the vacuum forming process.

Also contemplated by this invention are button inserts prepared by the process comprising providing a heated, heat-moldable printed overlay over a differential temperature vacuum forming tool, said differentially heated vacuum forming tool. Said differentially heated vacuum forming tool comprising a projecting male portion and surrounding said projecting male portion a separated recessed portion. The projecting male portion is cooled to a temperature less than the separated recessed portion. Then a vacuum is created on the heated, heat-moldable printed overlay to bring it into forming contact with said projecting male portion, thus producing printed button inserts in the overlay free of distortion.

The invention herein described has referred to a projecting male portion. It is readily apparent to those skilled in the art that the projecting male portion could take on a variety of projecting shapes. The term projecting male portion has been employed herein for convenience of use. The part could be referred to as a projecting elevated portion.

DESCRIPTION OF THE PREFERRED EMBODIMENTS

Figure 1:
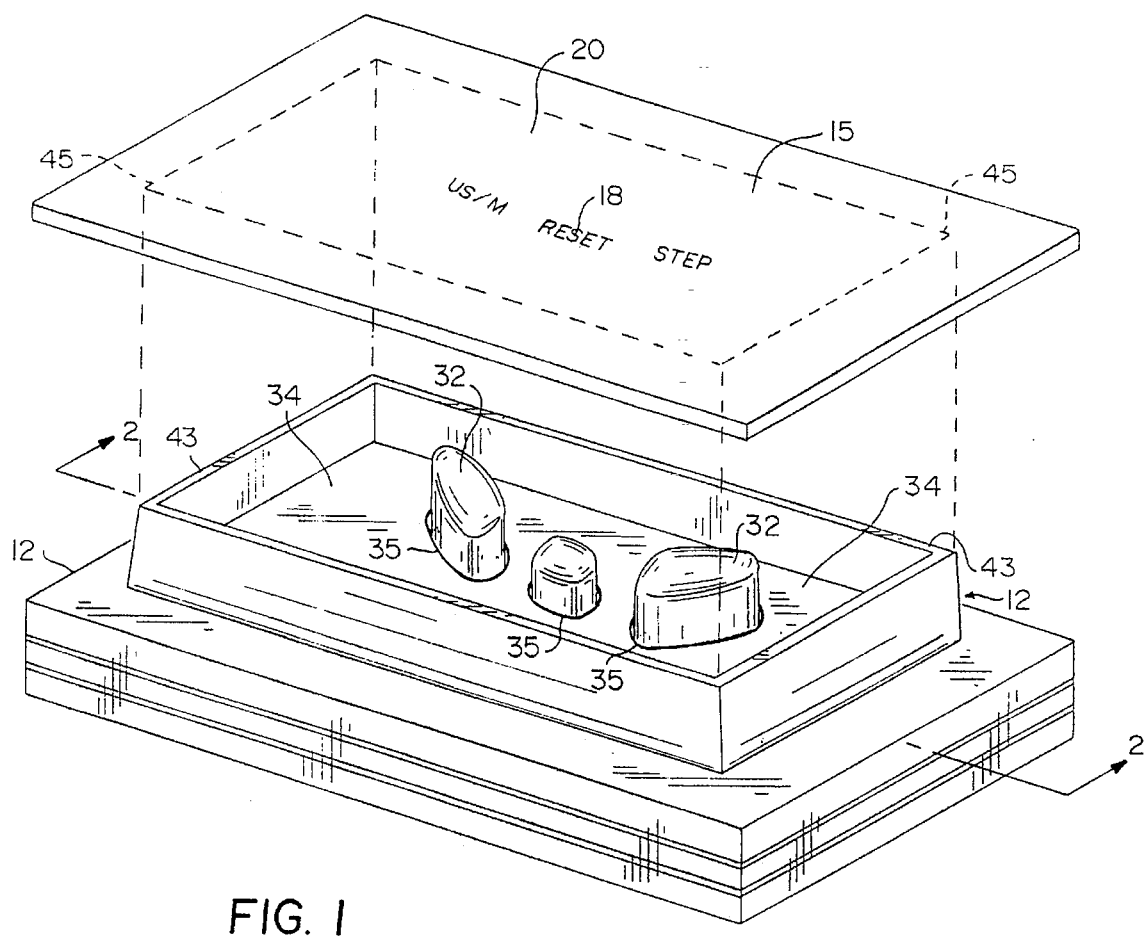
FIG. 1 is a perspective view illustrating the vacuum forming segment of the vacuum forming tool of this invention, with the overlay as it would be positioned prior to vacuum forming.
Figure 2:
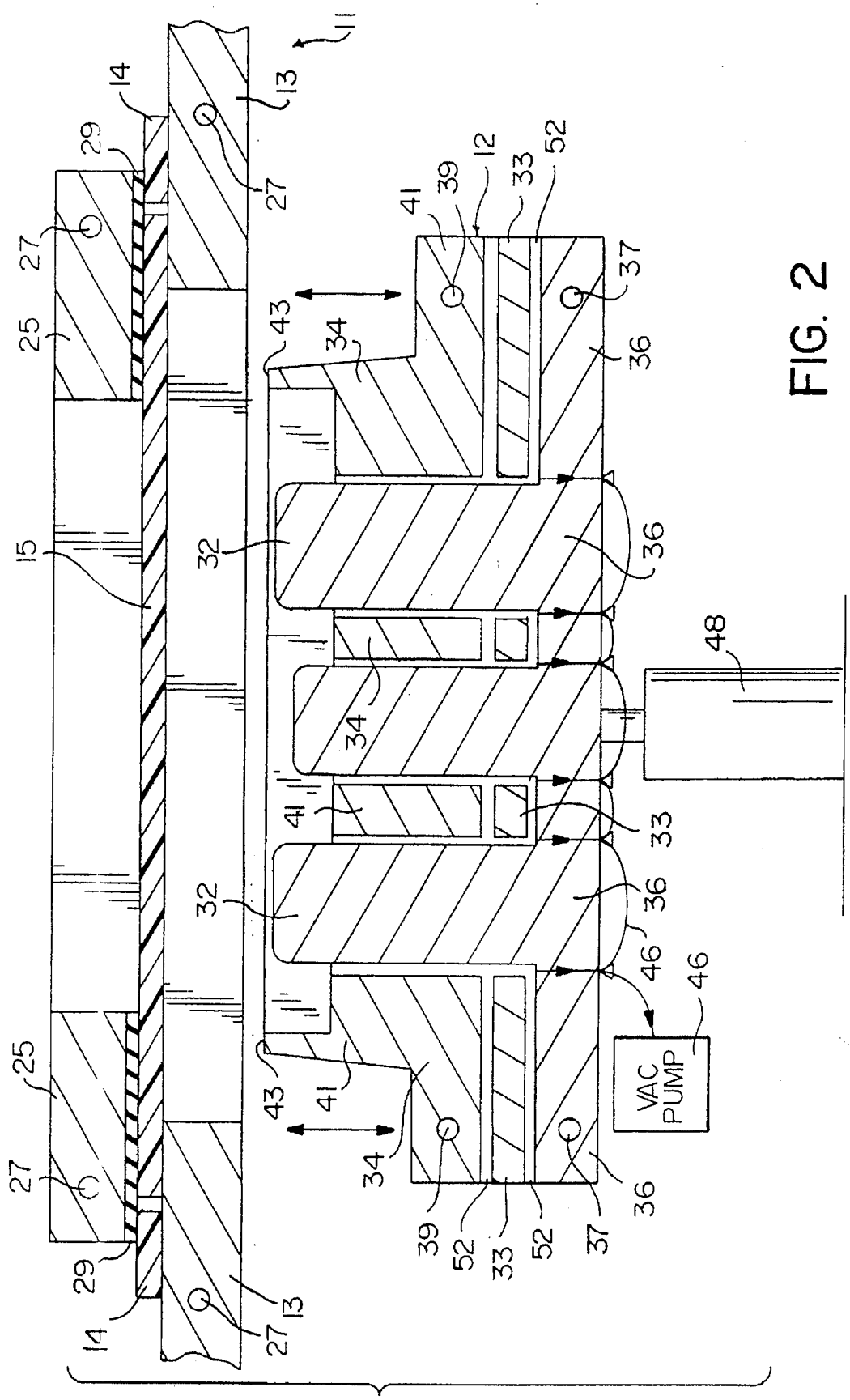
FIG. 2 is a cross-sectional view taken along lines 2—2 of FIG. 1 and 4—4 of FIG. 4.
Figure 3:
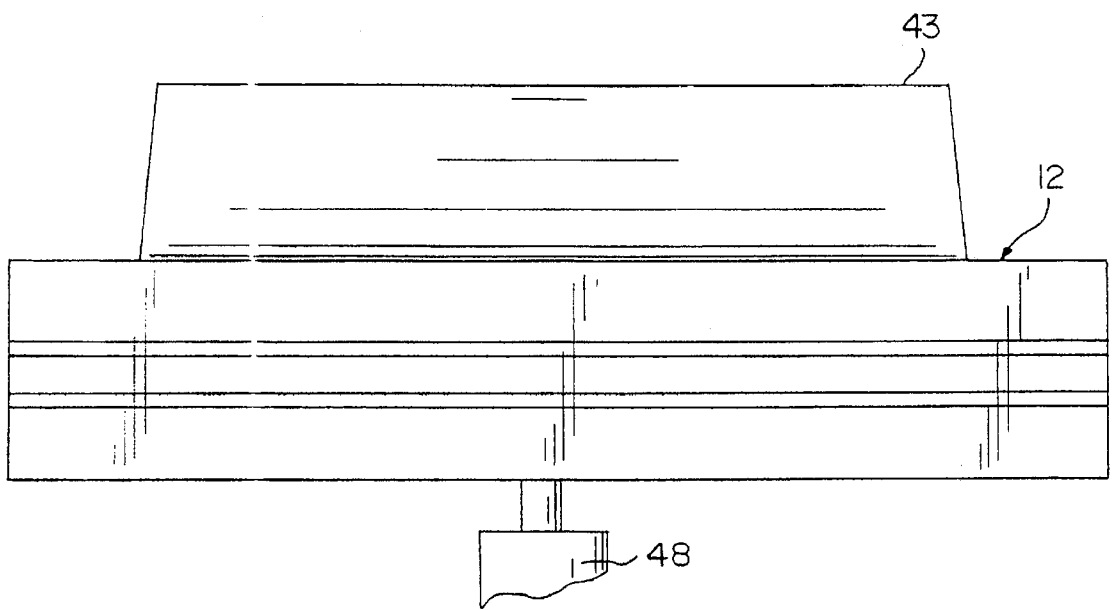
FIG. 3 is a front elevational view of the vacuum forming segment.
Figure 7:
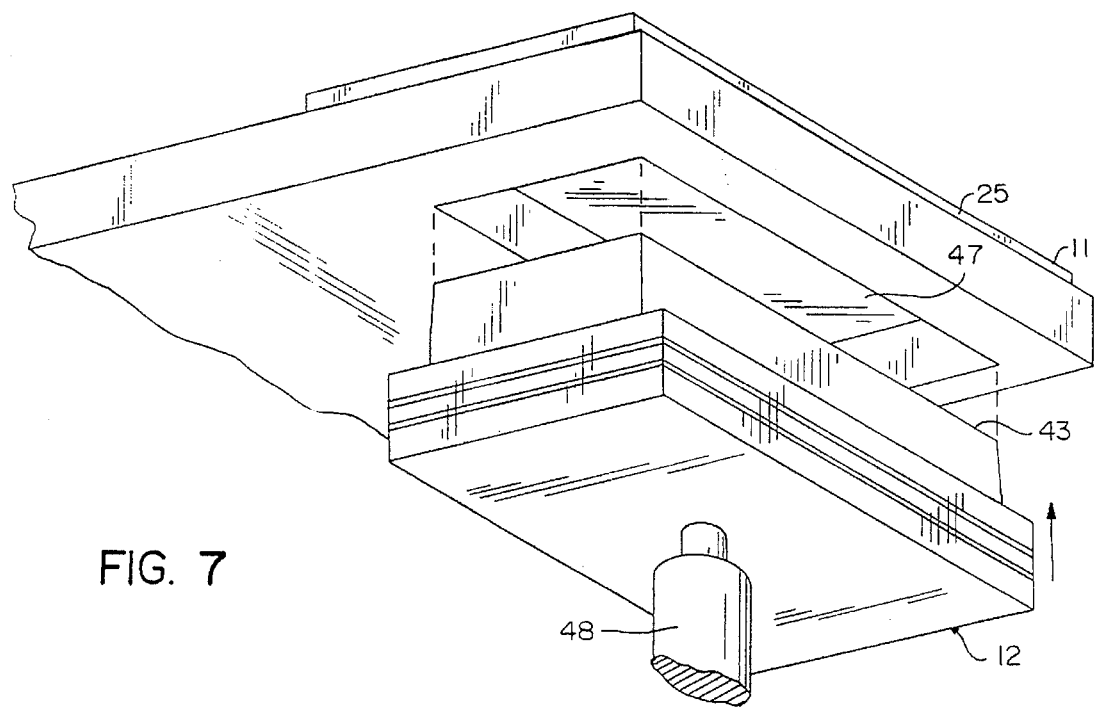
FIG. 7 is a bottom perspective view of the vacuum forming segment of the tool approaching the overlay for forming.
Figure 8:
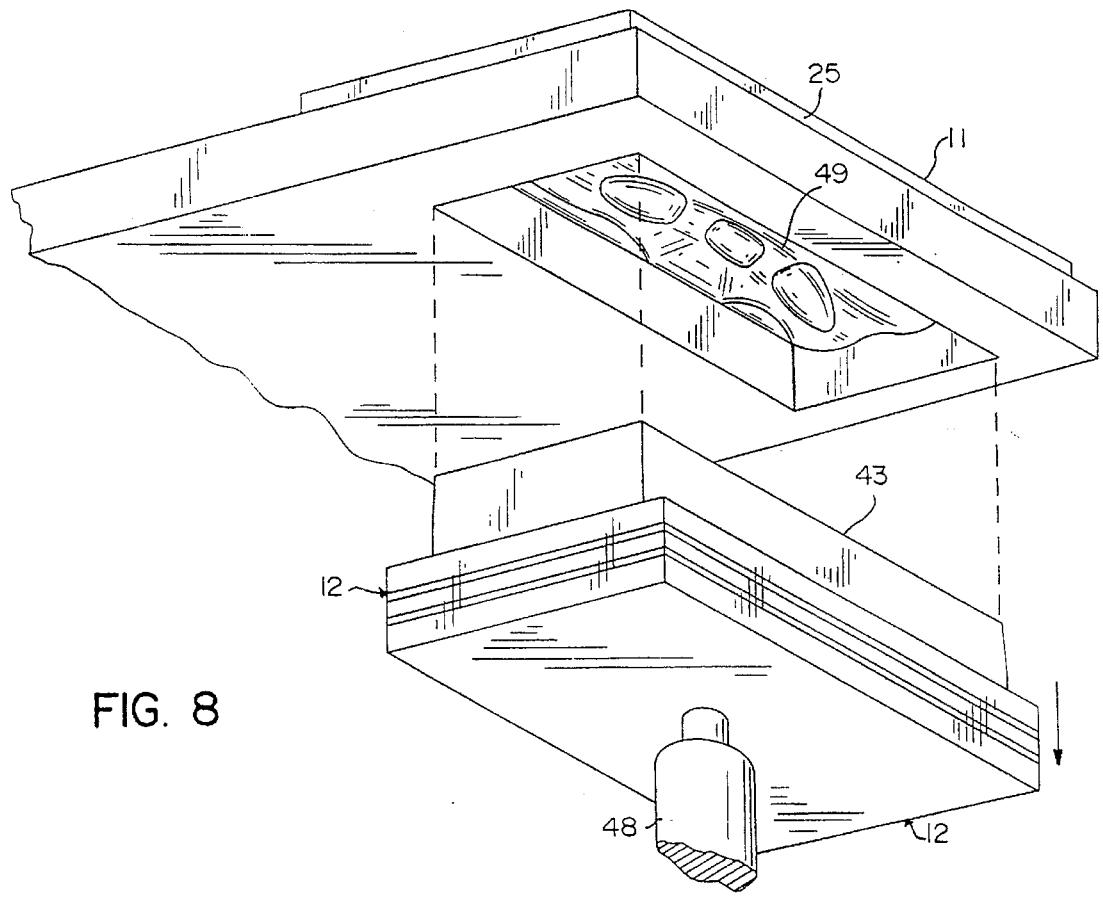
FIG. 8 is a bottom perspective view of the vacuum forming segment of the tool retreating after vacuum forming the overlay.

With reference to FIGS. 2, 7 and 8, the vacuum forming tool 10 has two major components. They are the upper clamping and heating segment 11 and the lower vacuum forming segment 12.

Figure 4:
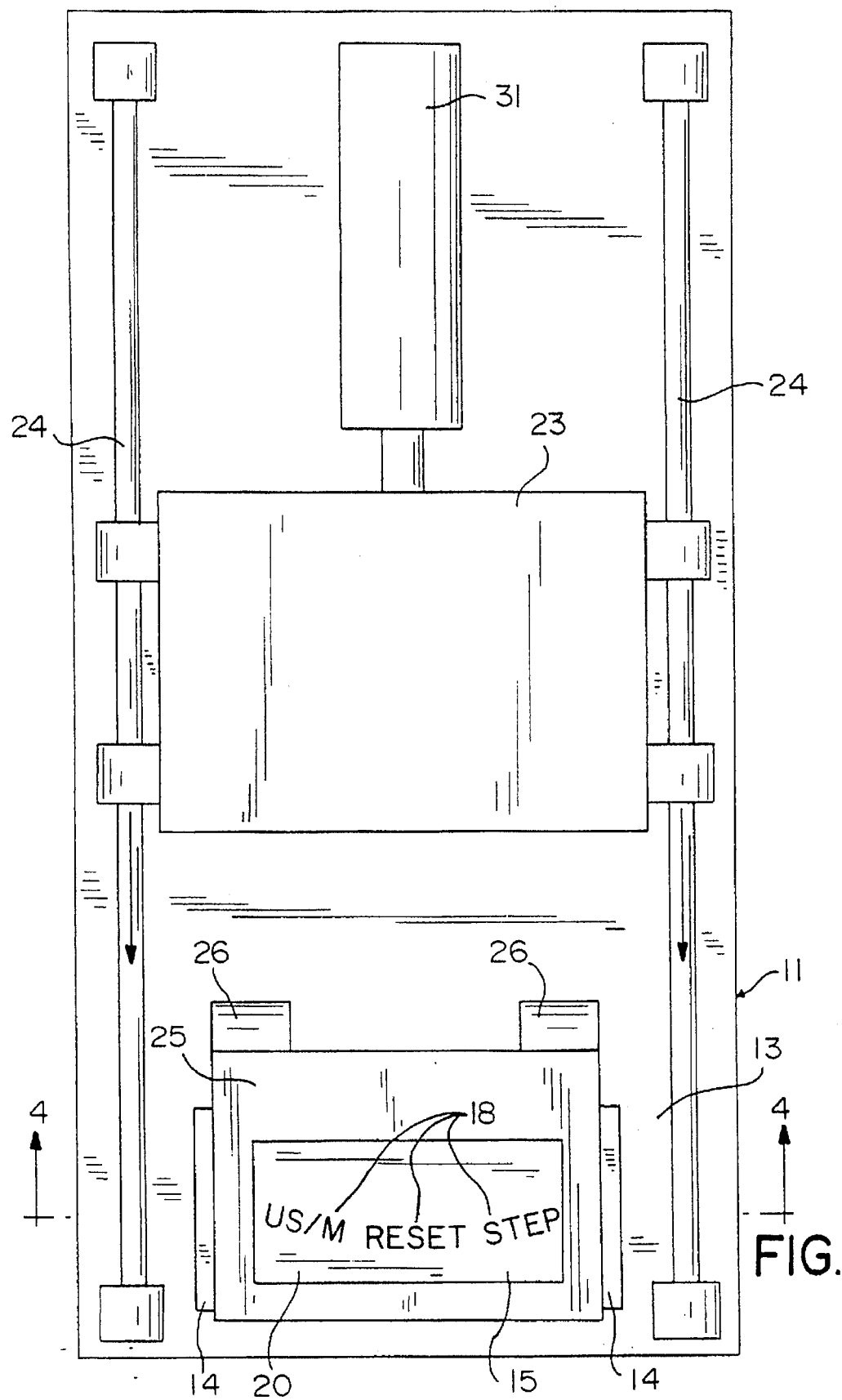
FIG. 4 is a top plan view of the clamp and heater segment of the vacuum forming tool.
Figure 5:
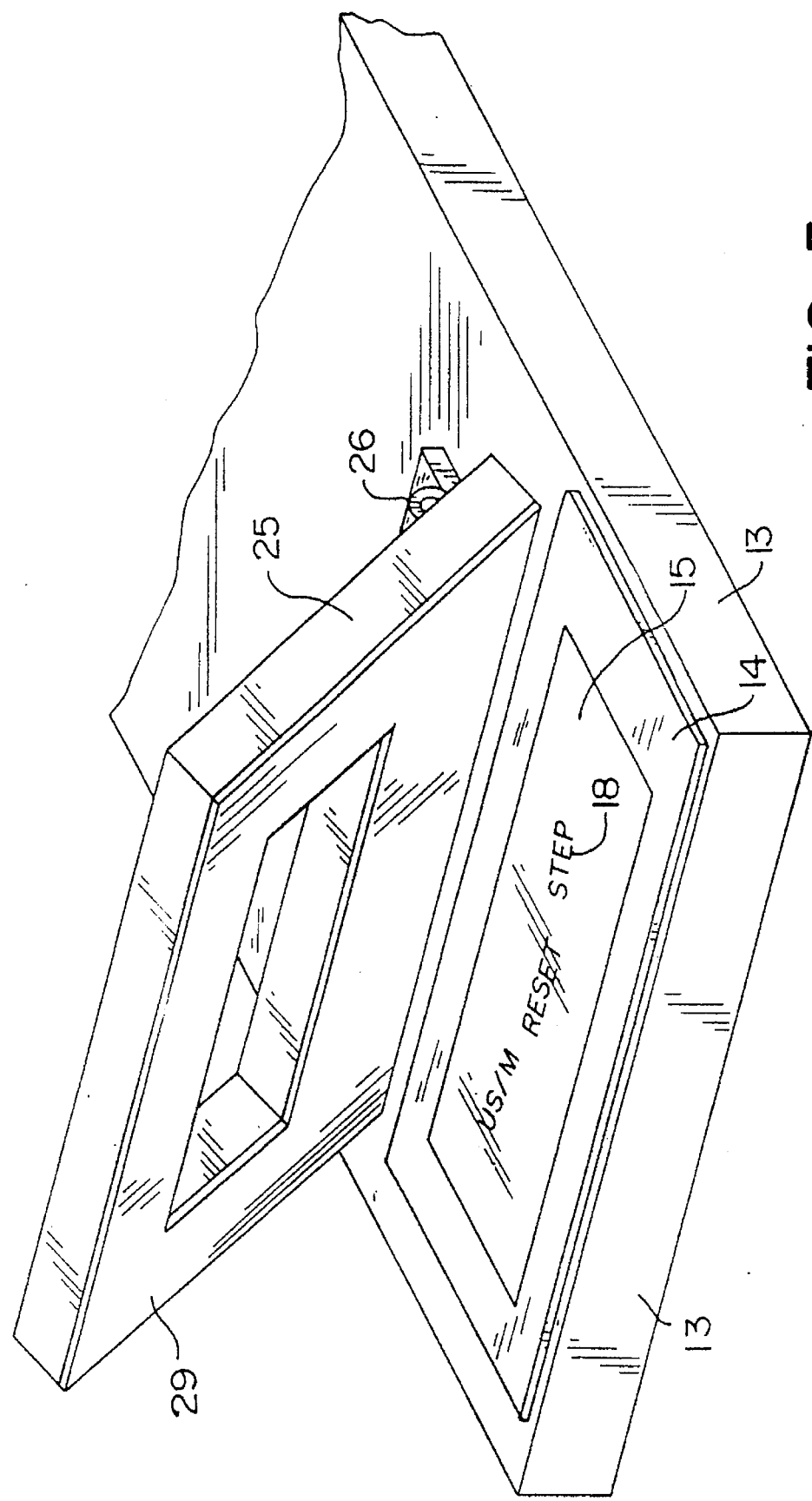
FIG. 5 is a perspective view of the clamp containing the overlay.
Figure 6:
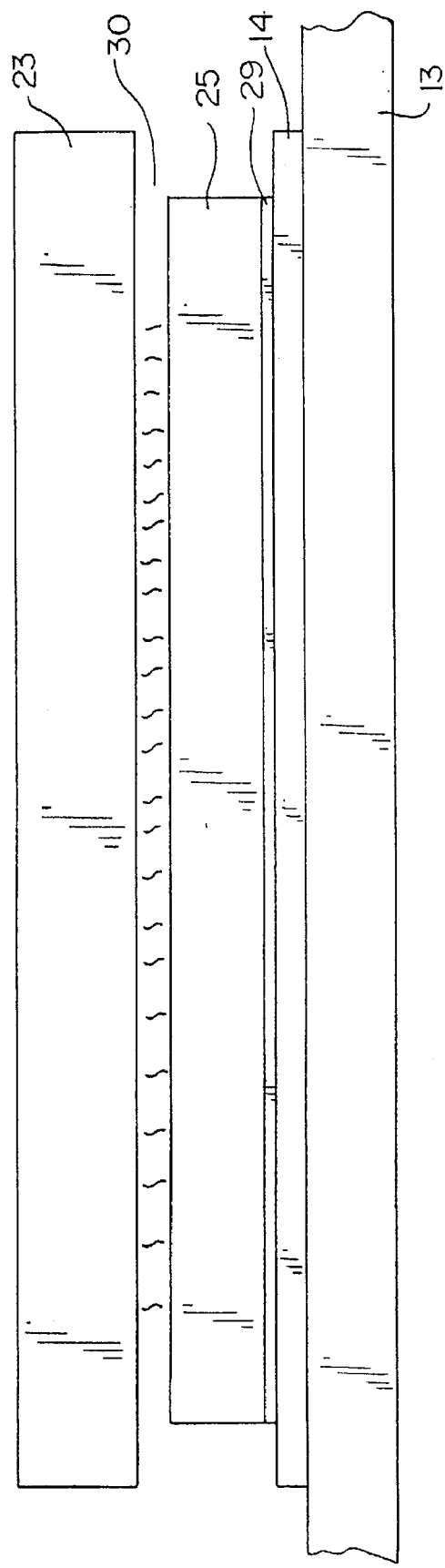
FIG. 6 is a front elevational view of the clamp and heater segment.

In FIGS. 2, and 4–6, the clamping and heating segment 11 has a base 13 supporting frame 14 which holds the overlay 15 in position, ready for forming the button inserts 17 of this invention. The overlay 15 with the art work 18 on its top surface 20 is placed in an aluminum frame 14 and is heated by a radiant heater 23 to 550°+F. Once the overlay 15 is placed in the aluminum frame 14, a clamp 25 secures the overlay 15 in the frame 14. The clamp 25 shown (FIG. 5) is a hinged 26 water cooled clamp having an attached silicone seal 29. Water at 70° F. in drilled holes 27 (FIG. 2) is supplied around the clamp 25 and base 13. In order that there be good occlusion, a silicone rubber seal 29 (FIG. 2) is provided between the clamp 25 and the frame 14. The heater 23 for the clamping and heating segment 11 of the vacuum forming tool 10 is contained in a heater box. In the embodiment of this invention the heaters 23 are Black Body Radiant Heaters at a 1,000° F. The heater 23 is attached to a pneumatic cylinder 31 which is able to move the heater on rails 24 into position over the clamped overlay 15 (FIG. 4). The heater 23 during the heating step is situated two inches 30 above the overlay 15 (FIG. 6). Once the overlay 15 is heated and formed, the heater 23 is withdrawn using the pneumatic cylinder 31.

Referring to FIGS. 1–3, 7 and 8, the lower vacuum forming segment 12 has projecting male portions 32 and separated therefrom by insulation 33 is a surrounding recessed portion 34. In the figure shown, there are three projecting male components or portions 32 of the vacuum forming tool 10. The number of male components is not critical, but can vary depending on the number of components to be produced. The male portion components 32 of the tool 10 are cooled by water to 40° F. and the recessed portion 34 of the tool 10 surrounding the male projecting portion 32 is heated to 140° F. The vacuum forming tool segments 11, 12 are heated and cooled by water, however other methods of heating and cooling would be readily apparent to the worker skilled in the art.

In the embodiment of the vacuum forming tool 10 shown (FIG. 2), the male members 32 are a single unit 36 with cooling channels or conduits 37 carrying cooled water running through and around the unit 36. The recessed portion of the tool 34 surrounding the male members 32 of the unit is a single unit 41 with a heating channel or conduit 39 warmed water running therethrough.

As previously pointed out, the exemplary temperatures used in the vacuum molding process are 40° F. for the male section of the tool and 140° F. for the recessed portion surrounding the male portion of the tool. Of course, these temperatures are only illustrative and could vary based on such factors as the material from which the overlay is made (e.g. the type of plastic), the thickness of the overlay and the depth of button formation.

Around the upper perimeter of lower vacuum forming segment 12 is a seal frame surface 43 in registry with the perimeter 45 of the printed plastic overlay 15. The seal frame surface 43 shown is integral with the recessed portion 34 as a single piece.

Attached to the lower vacuum forming segment 12 is a vacuum system 46 surrounding the three projecting male portions 32. During the actual vacuum forming operation, a vacuum is applied all around 35 the projecting male portions 32. Exemplary of the vacuum applied is 29 inches of Hg. This vacuum draws down the softened plastic overlay 47 during the vacuum forming step.

The vacuum forming segment 12 of the tool 10 is attached at its bottom to a pneumatic vacuum driven cylinder 48 which raises the vacuum forming tool 12 to the come into forming position with the overlay 15. That is the seal frame surface 43 comes to close proximity with perimeter 45 of the overlay 15. Once in position, a vacuum is applied (e.g. 29" of Hg) and then turned off after several seconds. After the vacuum application step, the vacuum forming segment 12 is lowered by a pneumatic cylinder 48. The hinged water cooled clamp 25 opens pneumatically and the vacuum formed overlay 49 removed.

The two parts of the vacuum forming tool 10, namely the male single unit 36 and the recessed surrounding component 41 are separated by an insulation 33 and in the figure shown (FIG. 2) is ¼", however, this can vary depending upon need. A silicone sealant 52 seals the insulation between the male members 36 and the surrounding recessed portion 41 of the tool. However, other sealants would be operative.

The arrows in FIG. 4, 7 and 8 show direction of movement.

Figure 9:
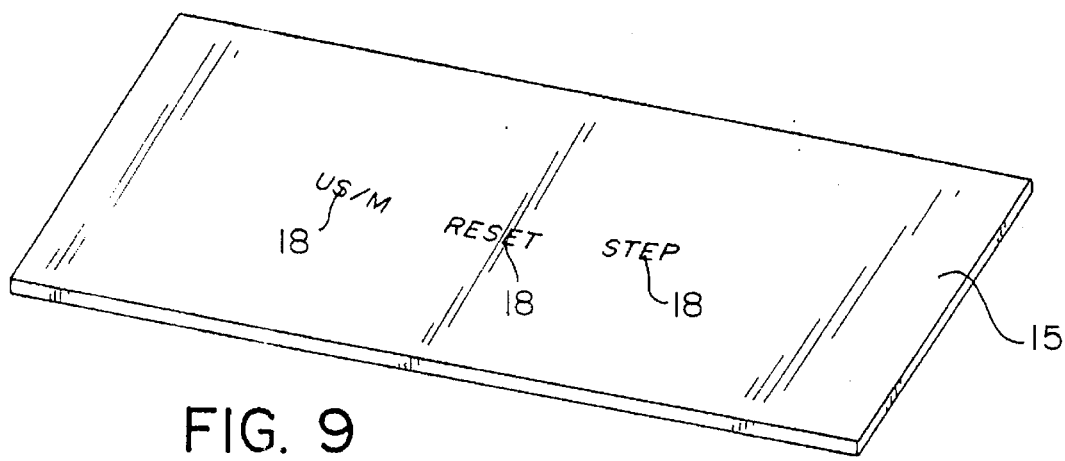
FIG. 9 is a view illustrating the overlay.
Figure 10:
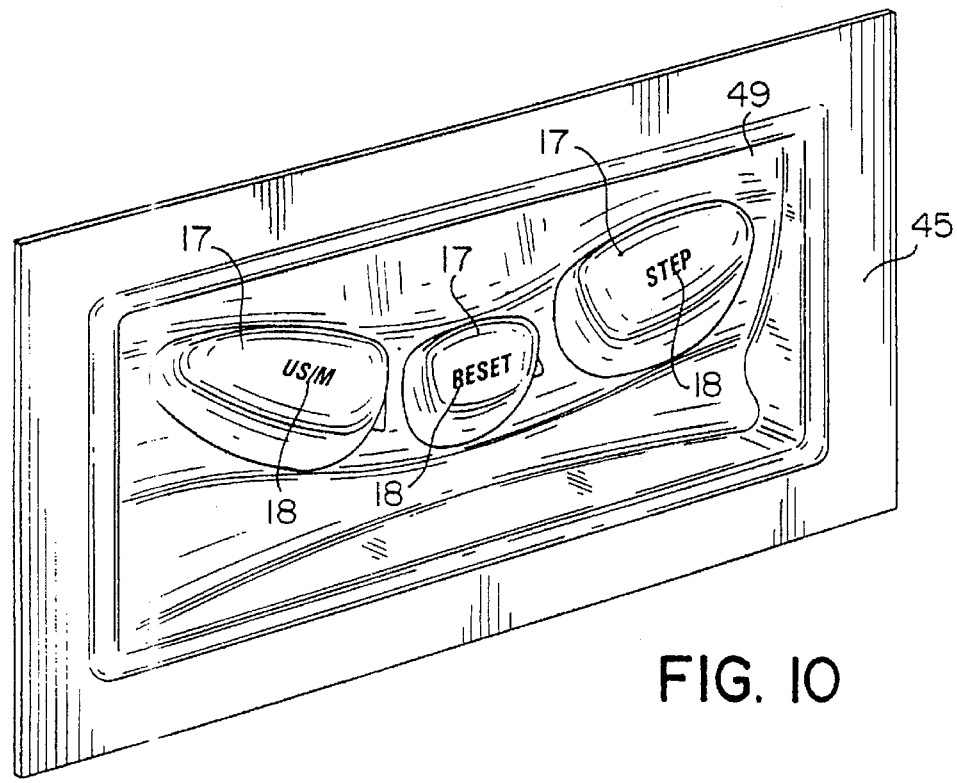
FIG. 10 is a view illustrating a vacuum formed overlay.

In carrying out the vacuum forming process of this invention a plastic overlay 15 with print 18 thereon (FIG. 9) is placed in frame 13 (FIG. 5) and secured within the frame with clamp 25 (FIG. 4). After clamping the overlay 15, the radiant heater 23 is brought into position to heat the overlay 15 (FIGS. 4 and 6). Once the overlay 15 is heated the vacuum forming segment 12 is raised (FIG. 7) so that the sealing surface 43 of the Vacuum forming segment 12 can contact and seal the overlay 15. With the overlay 15 sealed, vacuum is applied and the softened plastic of the overlay 15 is drawn by vacuum over the projecting male portion 32 to form the button insert 17 (FIG. 8 and 10).

Figure 11:
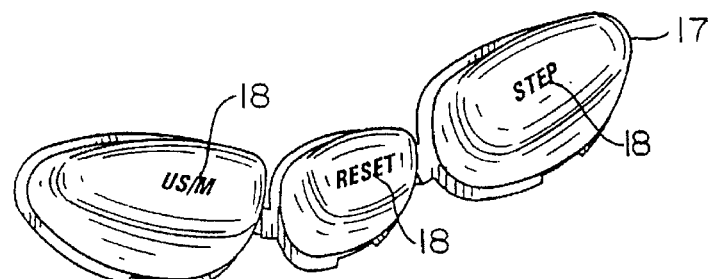
FIG. 11 is a view illustrating the attached button inserts.

After the vacuum forming, the formed plastic overlay (FIG. 10) is removed from the vacuum forming tool 10 and cut and trimmed to form, in the example shown, the formed insert 17 (FIG. 11).

Figure 12:
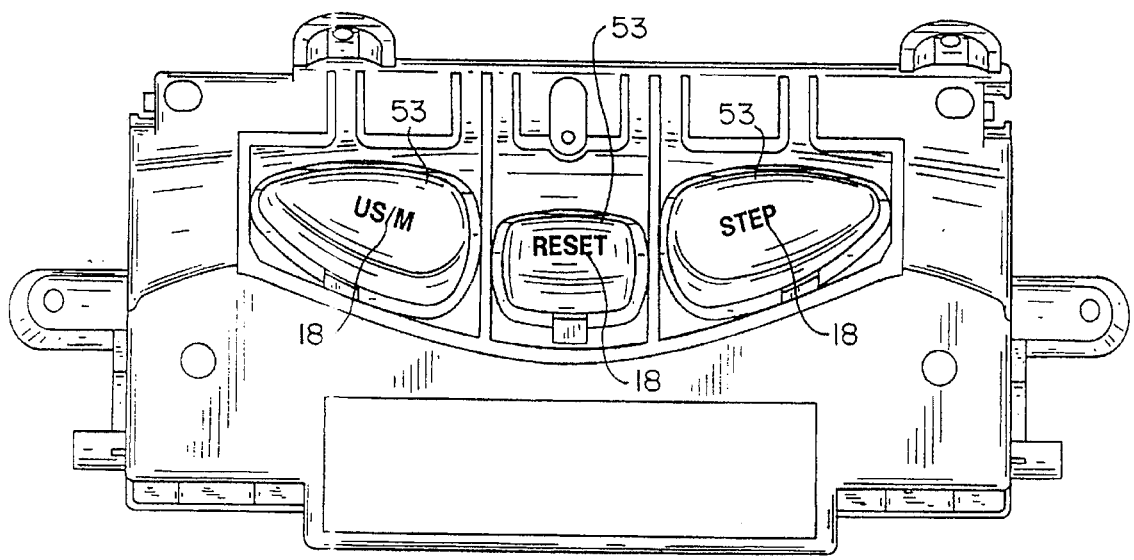
FIG. 12 is a view illustrating the button inserts fashioned into the buttons of the finished product.

The button inserts 17 are then put into a mold (not shown) and injection molded (by a process conventional in the art) to form buttons 53 (FIG. 12). In a specific application the produced buttons are back-lit buttons.

There are many advantages attendant to the use of this invention.

A prime advantage to the use of this invention is the fact that the temperature of the individual parts of the vacuum forming tool can be accurately controlled. With accurate temperature control, each part of the tool can be heated or cooled to its own optimum operating temperature to produce an elegantly formed finished product.

The process of this invention does not require expensive equipment and the vacuum formed products can be economically produced.

A most important advantage of the inventive process is that the back-lit buttons have balanced illumination.

The vacuum forming tool allows for the exact placement of the print on the overlay over the projecting male member of the vacuum forming mold so that there is no print distortion or misplacement of print indicia.

The tool of this invention allows for the accurate shaping of the button inserts.

Deep formed buttons are possible using the herein described vacuum forming tool of this invention.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A differential temperature vacuum forming tool for vacuum forming a moldable sheet comprising a cooled upwardly projecting male portion, a heated recessed portion separated from and surrounding said projecting male portion, wherein said heated recessed portion includes a sealing surface above said male portion, means for holding a moldable sheet above said projecting male portion and said recessed portion, means for heating said moldable sheet, means for bringing said heated moldable sheet into sealing contact with said sealing surface, and means for creating a vacuum to draw the heated moldable sheet into forming contact with said male portion when said heated moldable sheet is in sealing contact with said sealing surface and such that when an indicia bearing moldable sheet is applied over said cooled projecting male portion and heated separated recessed portion and a vacuum applied to the moldable sheet, a deep button insert is formed around the projecting male portion of the vacuum forming tool without distortion of said indicia.

2. The vacuum forming tool of claim 1, wherein a frame defining said means for holding said moldable sheet is juxtaposed above the projecting male portion of the vacuum forming tool.

3. The vacuum forming tool of claim 2, wherein said heating means is a heater box for heating and softening said moldable sheet held in said frame.

4. The vacuum forming tool of claim 1, wherein the bringing means is a mechanism to raise said male portion and heated recessed portion into sealing contact with said moldable sheet.

5. The vacuum forming tool of claim 1, wherein insulation separates the projecting male portion and separated recessed portion.

6. A differential temperature vacuum forming tool for vacuum forming a moldable sheet comprising a cooled upwardly projecting elevated portion, a heated separated recessed portion surrounding said cooled upwardly projecting elevated portion wherein said heated separated recessed portion includes a sealing surface above said elevated portion, means for holding a moldable sheet above said projecting elevated portion and said heated separated recessed portion, means for heating said moldable sheet, means for bringing said heated moldable sheet into sealing contact with said sealing surface, and means for creating a vacuum to draw the heated moldable sheet into forming contact with said elevated portion when said heated moldable sheet is in sealing contact with said sealing surface and wherein the projecting elevated portion is cooled to a temperature less than the heated separated recessed portion, such that when an indicia bearing moldable sheet is applied over said projecting elevated portion and heated separated recessed portion and vacuum supplied to the moldable sheet, the moldable sheet forms around the projecting elevated portion of the vacuum forming tool without distorting said indicia.

* * * * *